United States Patent
Chen

(10) Patent No.: US 10,820,671 B1
(45) Date of Patent: Nov. 3, 2020

(54) ASSEMBLY STRUCTURE OF TUBULAR BODY AND HANDLE

(71) Applicant: ST. YORK ENTERPRISE CO., LTD., Taichung (TW)

(72) Inventor: Ying Jen Chen, Taichung (TW)

(73) Assignee: ST. YORK ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 16/711,331

(22) Filed: Dec. 11, 2019

(51) Int. Cl.
*A45B 9/02* (2006.01)
*A01D 1/14* (2006.01)
*B25G 3/12* (2006.01)
*A45B 9/00* (2006.01)

(52) U.S. Cl.
CPC ............... *A45B 9/02* (2013.01); *B25G 3/12* (2013.01); *A01D 1/14* (2013.01); *A45B 2009/002* (2013.01); *Y10T 403/7047* (2015.01)

(58) Field of Classification Search
CPC .... A45B 9/02; B25B 3/00; B25B 3/12; A01D 1/14; Y10T 403/4047; Y10T 403/1616; Y10T 403/1624
USPC ............... 135/72, 76; 16/422, 426, DIG. 24, 16/DIG. 25; 403/33, 306
See application file for complete search history.

(56) References Cited

U.S. PATENT DOCUMENTS

| | | | | | |
|---|---|---|---|---|---|
| 2,410,882 | A | * | 11/1946 | Lansden | ............... A01D 1/14 16/110.1 |
| 2,568,654 | A | * | 9/1951 | Neptune | ............... A61H 3/02 135/69 |
| 2,741,255 | A | * | 4/1956 | Neptune | ............... A61H 3/02 135/72 |

* cited by examiner

*Primary Examiner* — Robert Canfield
(74) *Attorney, Agent, or Firm* — Guice Patents PLLC

(57) ABSTRACT

An assembly structure of a tubular body and a handle includes a tube, two connecting members, a handle, a position-limiting member and a blocking member. The tubular body has at least one pair of insertion holes. Each connecting member has a concave surface with a positioning post. The connecting members are mounted on the outer periphery of the tubular body with the positioning posts inserted into the insertion holes respectively. The handle is connected to a coupling base. The coupling base has a mounting hole and is mounted around the connecting members. The position-limiting member and the blocking member are provided at two opposite ends of the connecting members respectively and abut against two opposite ends of the coupling base respectively. The assembly structure allows the handle to be easily and securely mounted and positioned on the tubular body.

12 Claims, 13 Drawing Sheets

ASSEMBLY STRUCTURE OF TUBULAR BODY AND HANDLE

BACKGROUND OF THE INVENTION

1. Technical Field

The present invention relates to a handle mounting structure. More particularly, the invention relates to an assembly structure of a tubular body and a handle, the assembly structure allows the handle to be rapidly and securely mounted on the tubular body.

2. Description of Related Art

Walking sticks are used as an aid to walking. Referring to FIG. 1A, the conventional walking stick 1 has a tubular body 2 and a handle 3 mounted on an upper portion of the tubular body 2 so that a user can grip the handle 3 while using the walking stick 1. The handle 3 is connected to the tubular body 2 via a clamping base 4. The clamping base 4 is a generally C-shaped mounting ring and has an opening 5. Each of the two sides of the opening 5 is extended with a side plate 6, and each side plate 6 is provided with a hole (not shown). The clamping base 4 is mounted around the tubular body 2, with a bolt 7 passed through the holes of the two side plates 6 and connected to a nut 8 in order to lock the two side plates 6 tightly together, thereby clamping the clamping base 4 on the tubular body 2. However, the way the handle 3 is connected to the tubular body 2 (i.e., using the bolt 7 and the nut 8 to tighten the clamping base 4 around the tubular body 2) is not secure and may fail to fix the handle 3 in position. Moreover, the fact that the holes must be drilled through the clamping base 4 makes it difficult to manufacture or machine the clamping base 4.

FIG. 1B shows another conventional walking stick 1', which also has a tubular body 2 and a handle 3. The tubular body 2 is formed by inserting an inner tube 21 into an outer tube 22 and allows adjustment in length in a telescoping manner. The handle 3 is mounted on the tubular body 2 through a mounting member 9, and is secured with a rivet 91. Due to the rivet 91, the handle 3 of the walking stick 1' cannot be adjusted in position. Furthermore, the portion of the rivet 91 that extends into the tubular body 2 interferes with and limits the telescoping movement between the inner tube 21 and the outer tube 22.

BRIEF SUMMARY OF THE INVENTION

The primary objective of the present invention is to provide an assembly structure of a tubular body and a handle in which the handle is easily and securely mounted on the tubular body and whose components are structurally simple and can be manufactured with ease.

Another objective of the present invention is to provide an assembly structure of a tubular body and a handle in which the handle can be adjusted in terms of its mounting position on the tubular body.

Yet another objective of the present invention is to provide an assembly structure of a tubular body and a handle in which the handle can be adjusted in terms of its mounting angle with respect to the tubular body.

To achieve the foregoing objectives, the present invention provides an assembly structure of a tubular body and a handle, wherein the assembly structure includes:

the tubular body, whose outer peripheral wall has two corresponding sides each provided with at least one insertion hole;

two connecting members each having a wall surface formed as a concave surface, wherein the concave surface of each of the two connecting members is protrudingly provided with a positioning post, the two concave surfaces of the two connecting members are mounted on the outer periphery of the tubular body, the two positioning posts are inserted into the two insertion holes of the tubular body respectively, and each of the two connecting members further has a first end and a second end;

the handle, which is connected to a coupling base, the coupling base has a first end and a second end and is provided with a mounting hole, the mounting hole is provided in the coupling base and opens at the two ends of the coupling base, the coupling base is mounted around the two connecting members, and the two connecting members are restricted in the mounting hole;

a position-limiting member formed as a hollow cylinder, the position-limiting member has a through hole that opens at two ends of the position-limiting member, and the position-limiting member is connected to the first ends of the two connecting members and has one end abutting against the first end of the coupling base; and a blocking member provided at the second ends of the two connecting members, wherein the blocking member abuts against the second end of the coupling base.

The two connecting members are connected to and positioned on the tubular body. The handle is mounted on the two connecting members via the coupling base, the position-limiting member and the blocking member abut against two ends of the coupling base respectively to keep the handle securely mounted on the tubular body.

BRIEF DESCRIPTION OF THE SEVERAL VIEWS OF THE DRAWINGS

Three preferred embodiments of the present invention will be presented below and detailed with reference to the accompanying drawings, in which.

DETAILED DESCRIPTION OF THE INVENTION

Figure 1A:
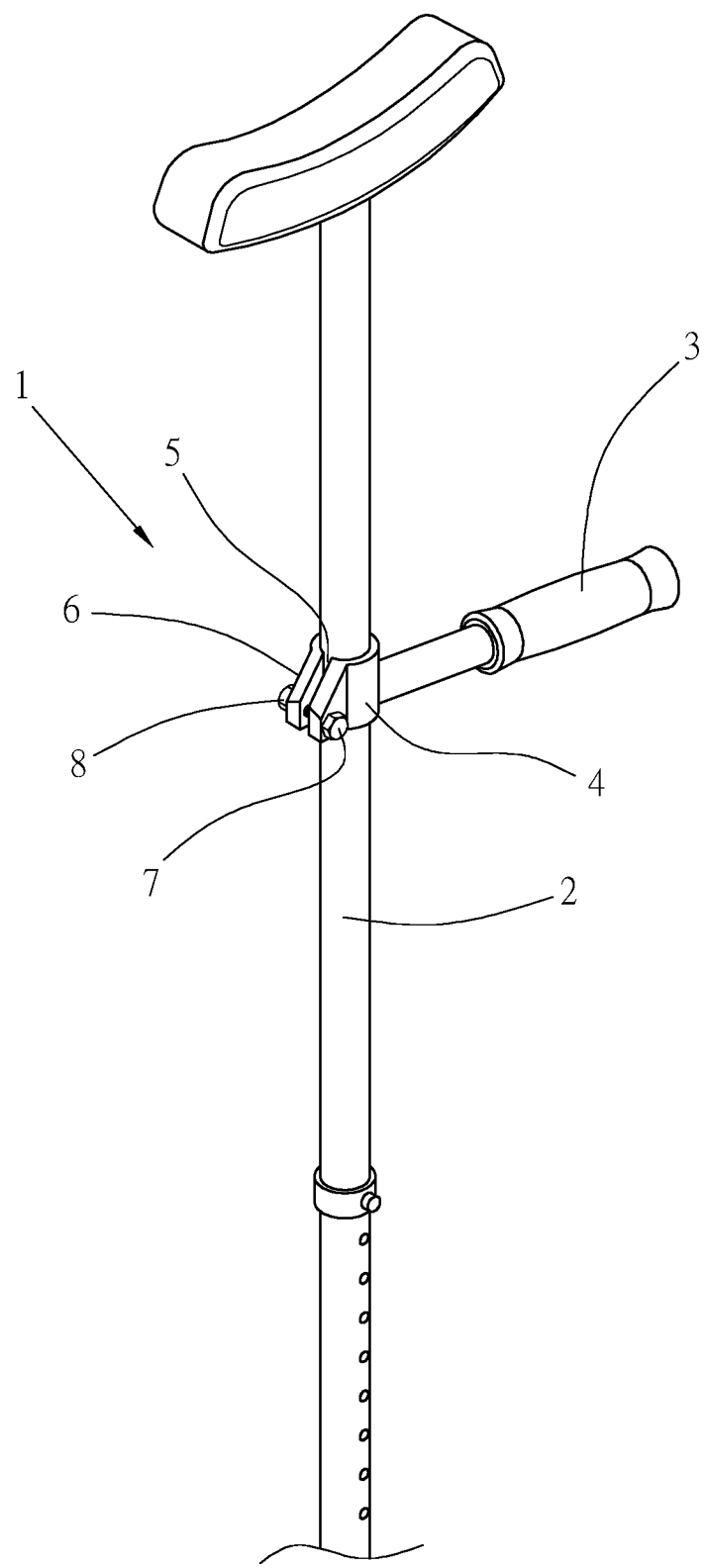
FIG. 1A is a perspective view of a conventional walking stick.
Figure 1B:
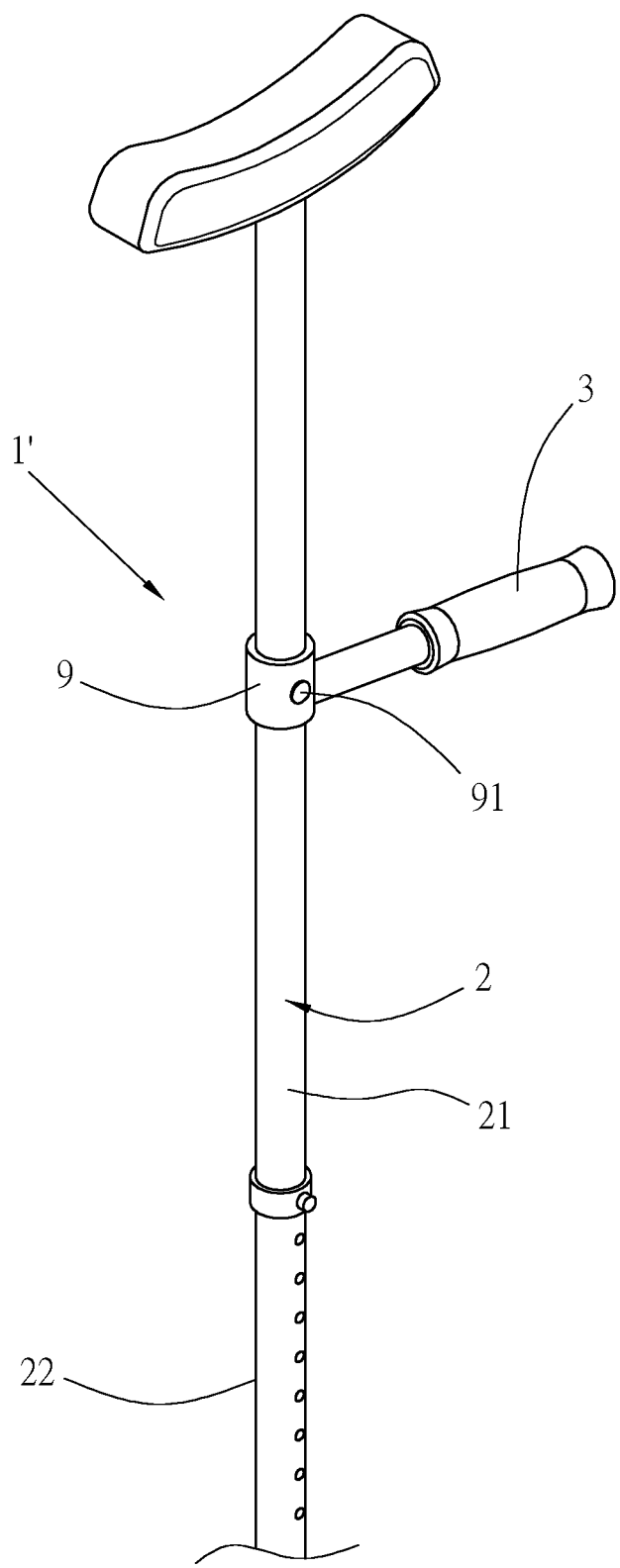
FIG. 1B is a perspective view of another conventional walking stick.

Referring to FIG. 2 to FIG. 5, the assembly structure 100 of a tubular body and a handle according to the first preferred embodiment of the present invention includes a tubular body 10, two connecting members 20, a handle 30, a position-limiting member 40, and a blocking member 50.

Figure 2:
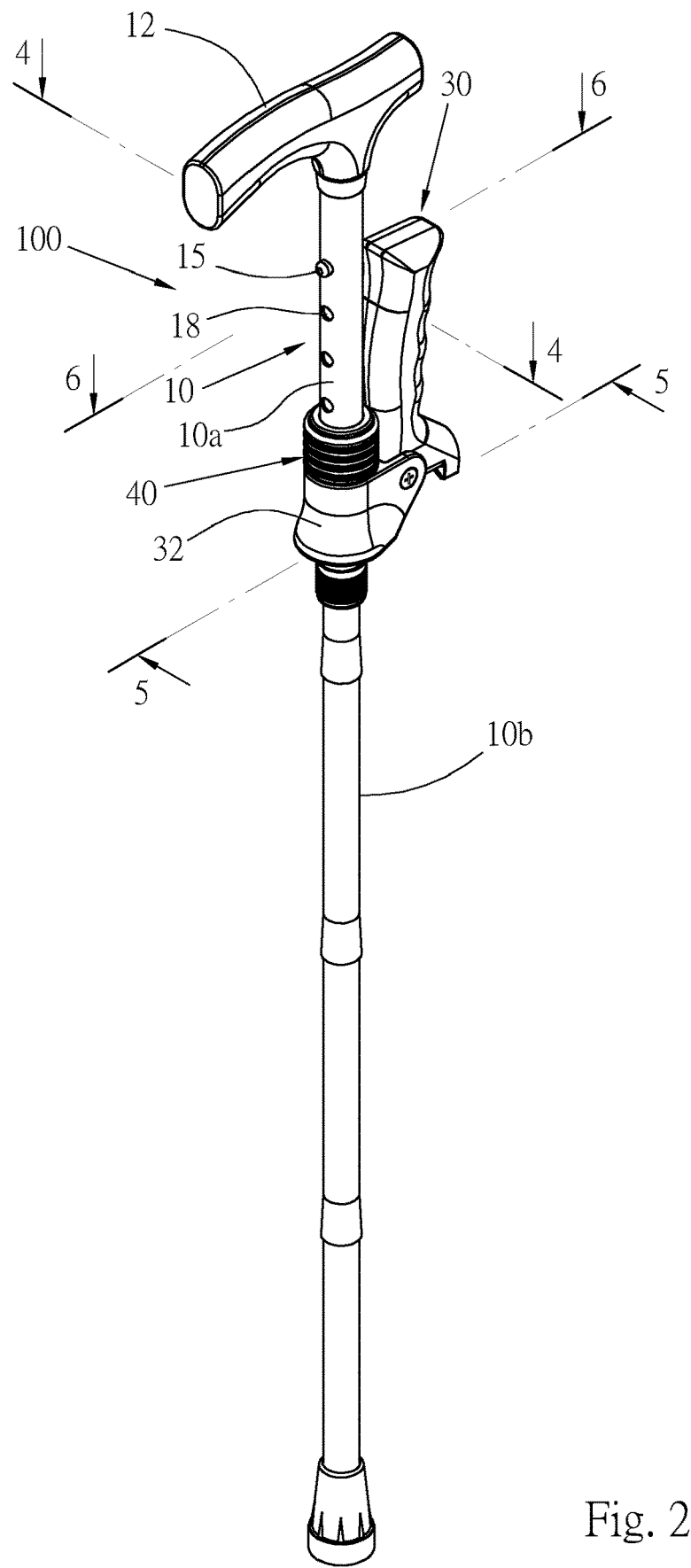
FIG. 2 is a perspective view of the assembly structure of a tubular body and a handle according to the first preferred embodiment of the invention.
Figure 3:
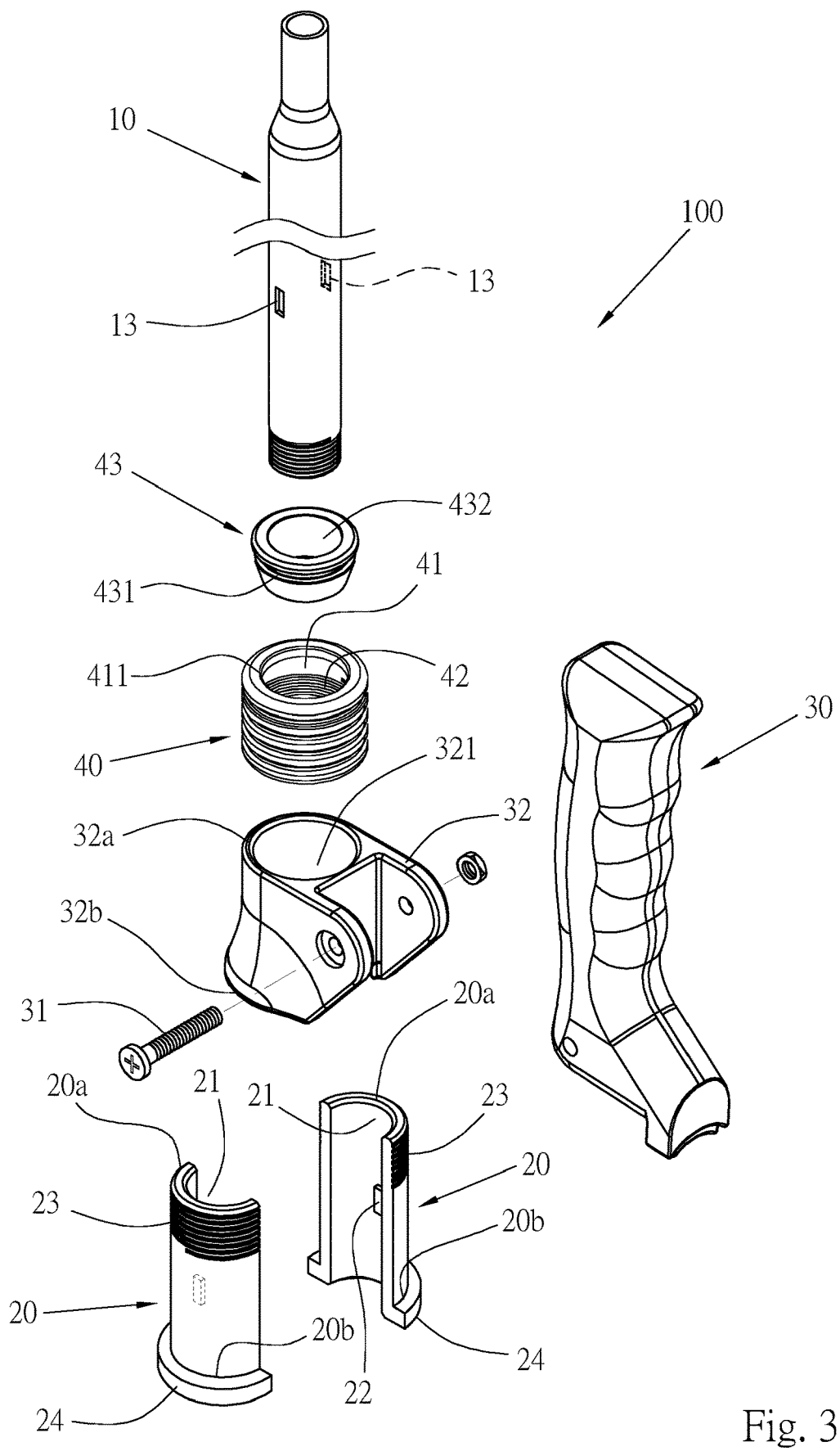
FIG. 3 is an exploded perspective view of the assembly structure in FIG. 2.

The tubular body 10 in the present invention may be the tubular body of a walking stick, a tube of a bicycle, or other similar tubes. The structure of the invention is intended to facilitate the mounting of the handle 30 onto a tubular body, such as mounting a handle onto a walking stick or mounting a bicycle handgrip onto a bicycle tube. As shown in FIG. 2, the tubular body 10 in this embodiment is the tubular body of a walking stick by way of example, and the tubular body is provided with a head portion 12.

The peripheral wall of the tubular body 10 is provided with a pair of insertion holes 13. The two insertion holes 13 correspond to each other and are located on two sides of the tubular body respectively. In this embodiment, the insertion holes 13 preferably have a rectangular or polygonal shape.

The two connecting members 20 have identical structures. Each connecting member 20 is a generally semicircular arc-shaped plate and has a wall surface curved inward to form a semicircular, concave surface 21. The concave surface 21 of each connecting member 20 is protrudingly provided with a positioning post 22. Each the positioning post 22 correspond in shape to the insertion hole 13 and has a rectangular or polygonal shape. The two connecting members 20 are mounted on the outer periphery of the tubular body 10 in an opposing manner such that the concave surfaces 21 are in contact with the peripheral surface of the tubular body 10. The two positioning posts 22 are inserted into the two insertion holes 13 of the tubular body 10 respectively. Each of the two connecting members 20 has two ends, namely a first end 20a and a second end 20b. The outer periphery of the first end 20a of each connecting member 20 is provided with an external thread 23. The second end 20b of each connecting member 20 extends radially outward to form a blocking ledge 24, which has a larger outer diameter than the connecting member 20. The two blocking ledges 24 of the two connecting members 20 form the blocking member 50. In this embodiment, each blocking ledge 24 has a semicircular outer edge, so the blocking member 50 formed by the two blocking ledges 24 has a circular configuration.

Figure 4:
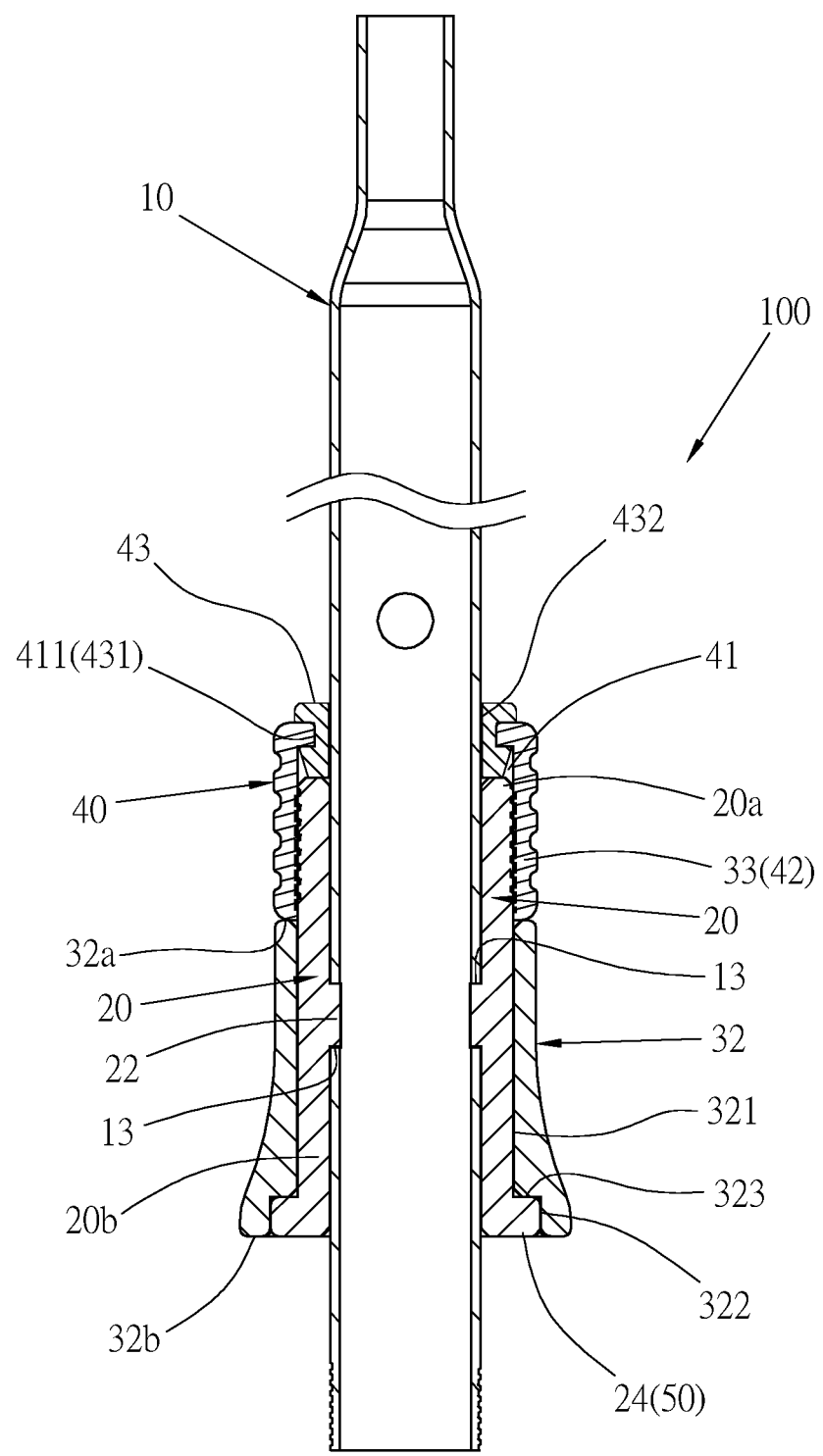
FIG. 4 is a sectional view taken along section line 4-4 in FIG. 2.
Figure 5:
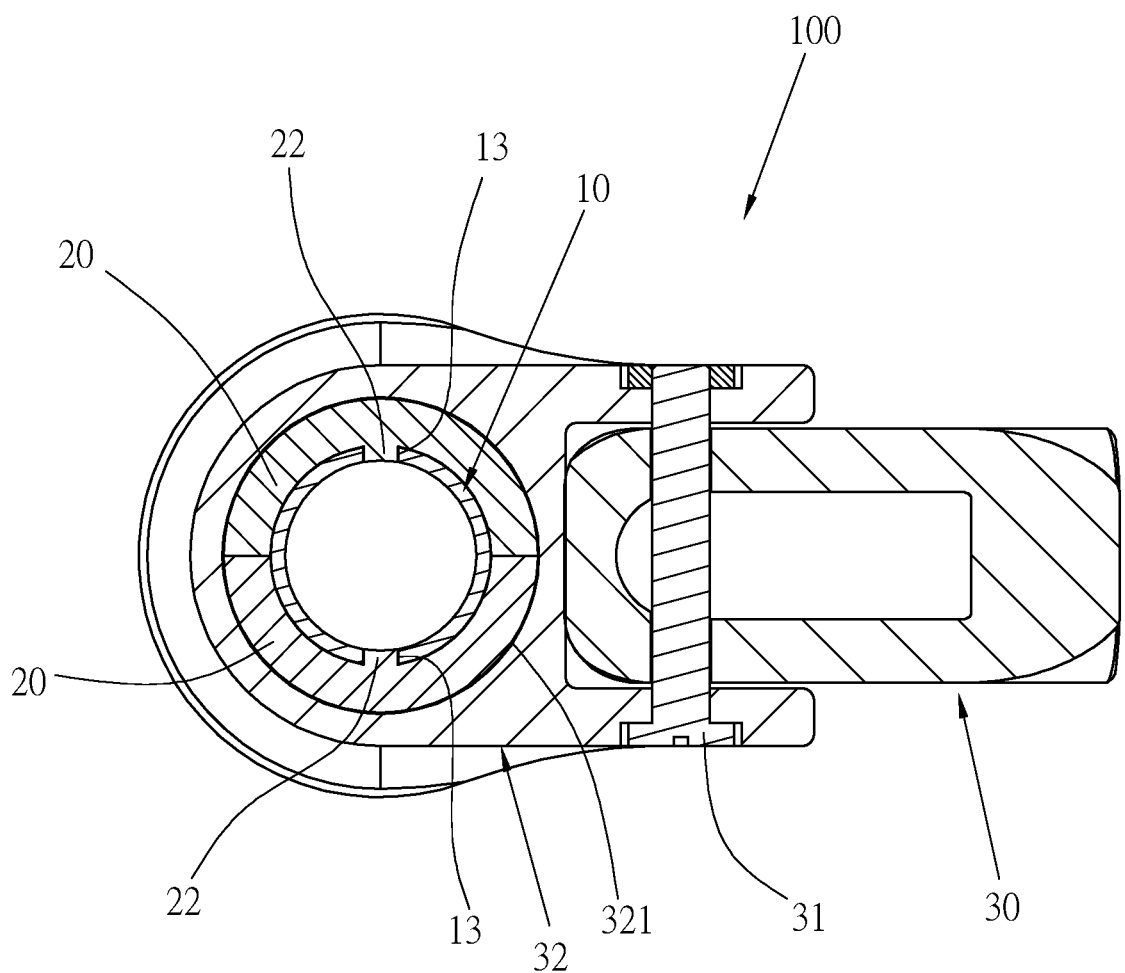
FIG. 5 is a sectional view taken along section line 5-5 in FIG. 2.

The handle 30 is fixedly or pivotally connected to a coupling base 32 in order to be mounted on the tubular body via the coupling base 32. The present invention has no limitation on the configuration of the handle or how the handle is connected to the coupling base. The configuration of the handle and the way in which the handle is connected to the coupling base are not the subject matter of the invention. The handle 30 in this embodiment is pivotally connected to a pair of lugs on one side of the coupling base 32 via a pivot shaft 31. The coupling base 32 has a first end 32a, a second end 32b, and a mounting hole 321 that passes through the coupling base 32 and opens at the first end 32a and the second end 32b. As shown in FIG. 4, the second end 32b of the coupling base 32 is concavely formed with a groove 322. The groove 322 in this embodiment is circular in order to match the circular blocking member 50 formed by the two blocking ledges 24. The groove 322 is in communication with the mounting hole 321, and the width of the groove 322 is greater than the diameter of the mounting hole 321 such that a blocking shoulder 323 is formed between the groove 322 and the mounting hole 321. The coupling base 32 is mounted around the outer peripheries of the two connecting members 20 such that the two connecting members 20 are received in the mounting hole 321 of the coupling base 32, are restricted and limited by the wall of the mounting hole 321, and therefore stay mounted around the tubular body 10. The first ends 20a of the two connecting members 20 are exposed from the mounting hole 321 and exposed out of the coupling base 32, whereas the blocking member 50, which is formed by the blocking ledges 24 at the second ends 20b of the two connecting members 20, is coupled to the groove 322 and abuts against the blocking shoulder 323 to block the second end 32b of the coupling base 32. It is understood that the blocking member 50 can block the second end of the coupling base 32 even if the coupling base is not provided with the groove 322.

The position-limiting member 40 is a hollow cylinder and has a through hole 41 that extends along the axial direction of the position-limiting member 40. The wall of the through hole 41 is provided with an internal thread 42. The position-limiting member in this embodiment is a nut. The position-limiting member 40 is mounted around the tubular body 10 (i.e., the tubular body 10 is passed through the through hole 41 of the position-limiting member 40), is connected to the first ends 20a of the two connecting members 20, with the internal thread 42 threadedly connected with the external threads 23 at the first ends 20a of the two connecting members 20, and has one end abutting against the first end 32a of the coupling base 32. Thus, the coupling base 32 is blocked by the position-limiting member 40 and the blocking member 50 at two ends respectively and is hence retained in place. The other end (hereinafter referred to as the second end) of the position-limiting member 40 is connected with a flexible sealing member 43. The second end of the position-limiting member 40 forms a flange 411 that extends inward from the periphery of the through hole 41. The outer periphery of the flexible sealing member 43 is circumferentially provided with an annular groove 431. The flange 411 of the position-limiting member 40 is fitted in the annular groove 431 of the flexible sealing member 43. The flexible sealing member 43 has a through bore 432 at the center to allow passage of the tubular body 10. The flexible sealing member 43 serves to seal the gap between the position-limiting member 40 and the tubular body 10.

The foregoing assembly structure 100 of the tubular body and the handle is assembled as follows. The two connecting members 20 are mounted to encircle the tubular body 10, with the two positioning posts 22 on the two connecting members 20 inserted respectively into the two corresponding insertion holes 13 of the tubular body 10 to position the two connecting members 20 on the tubular body 10. After that, the coupling base 32 is mounted around the two connecting members 20 (i.e., the two connecting members 20 are inserted through the mounting hole 321 of the coupling base 32) to prevent the two connecting members 20 from separating from the tubular body. The coupling base 32 itself is mounted securely and is positioned on the tubular body 10 thanks to the blocking member 50 and the position-limiting member 40, which block and limit the coupling base 32 at two ends respectively. Thus, the assembly structure 100 makes it possible to mount and position the handle 30 firmly on the tubular body 10 of a walking stick or the like and to thereby overcome the aforesaid drawback of the conventional walking stick 1, i.e., tightening the clamping base 4 around the tubular body 2 of the walking stick with the bolt 7 and the nut 8 may fail to position the clamping base 4, and hence the handle 3, securely on the tubular body 2. The present invention is indeed capable of mounting the handle 30 more securely than with the prior art and features structurally simple components, easy assembly, and easy manufacture (simply considering the fact that the drilling operation conventionally required for the clamping base 4 is no longer needed).

Figure 6:
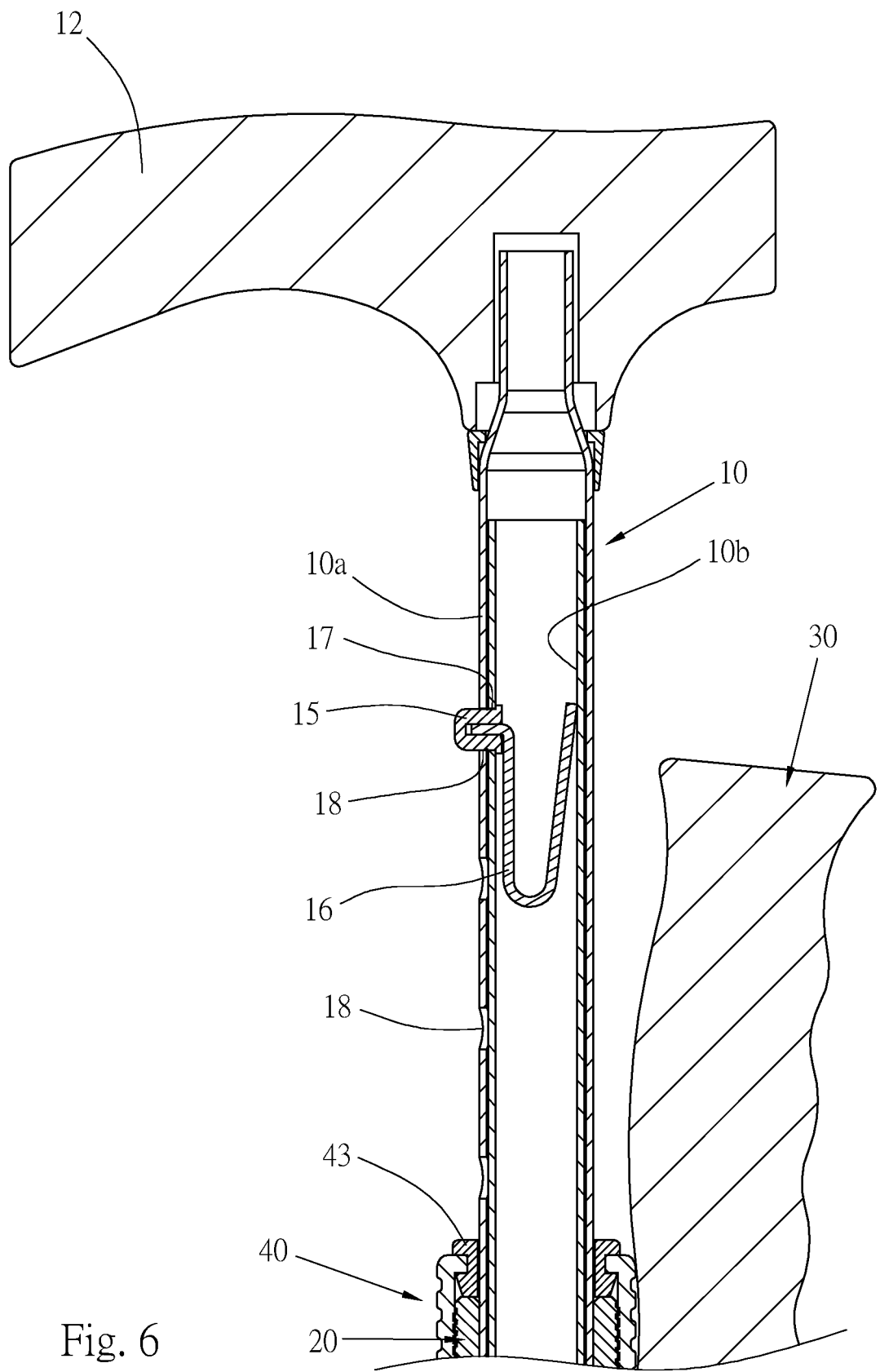
FIG. 6 is a sectional view taken along section line 6-6 in FIG. 2.

Referring to FIG. 6, the tubular body 10 in this embodiment is formed by an outer tube 10a and an inner tube 10b inside the outer tube 10a and can be extended and contracted in a telescoping manner. A fastener 15 and an elastic member 16 are mounted on the inner tube 10b. The fastener 15 extends through a hole 17 of the inner tube. The elastic member 16 pushes the fastener 15 elastically outward in order for the fastener 15 to extend through one of a plurality of fastening holes 18 of the outer tube 10a. The length of the tubular body 10 can be adjusted by fastening the fastener 15 to the fastening hole 18 at a desired position.

The tubular body 10 can be adjusted in length in a telescoping manner because the structure of the present invention does not have any component that extends into the outer tube 10a and interferes with or limits the movement of the inner tube 10b within the outer tube 10a.

Figure 7:
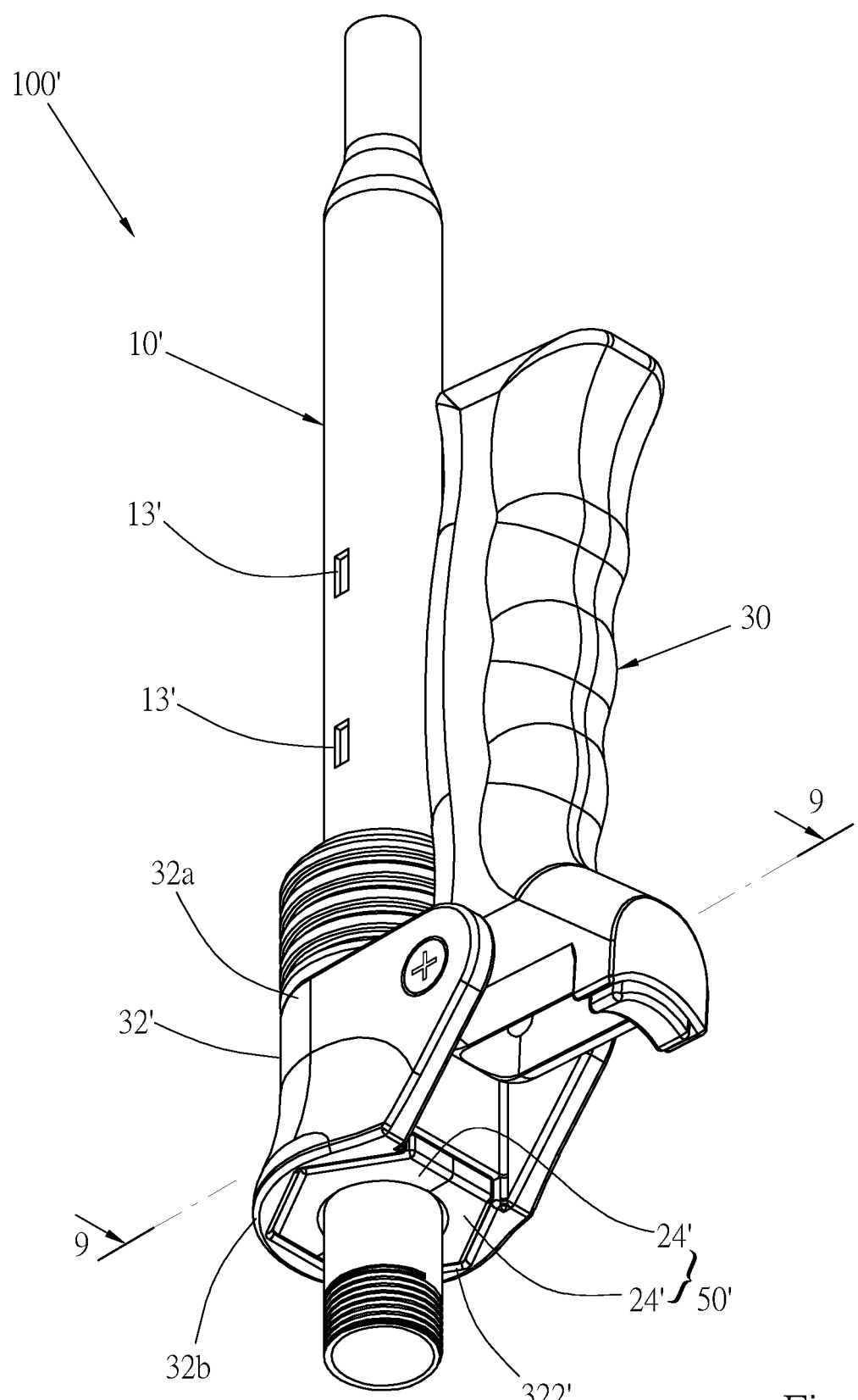
FIG. 7 is a bottom perspective view of the assembly structure of a tubular body and a handle according to the second preferred embodiment of the invention.
Figure 8:
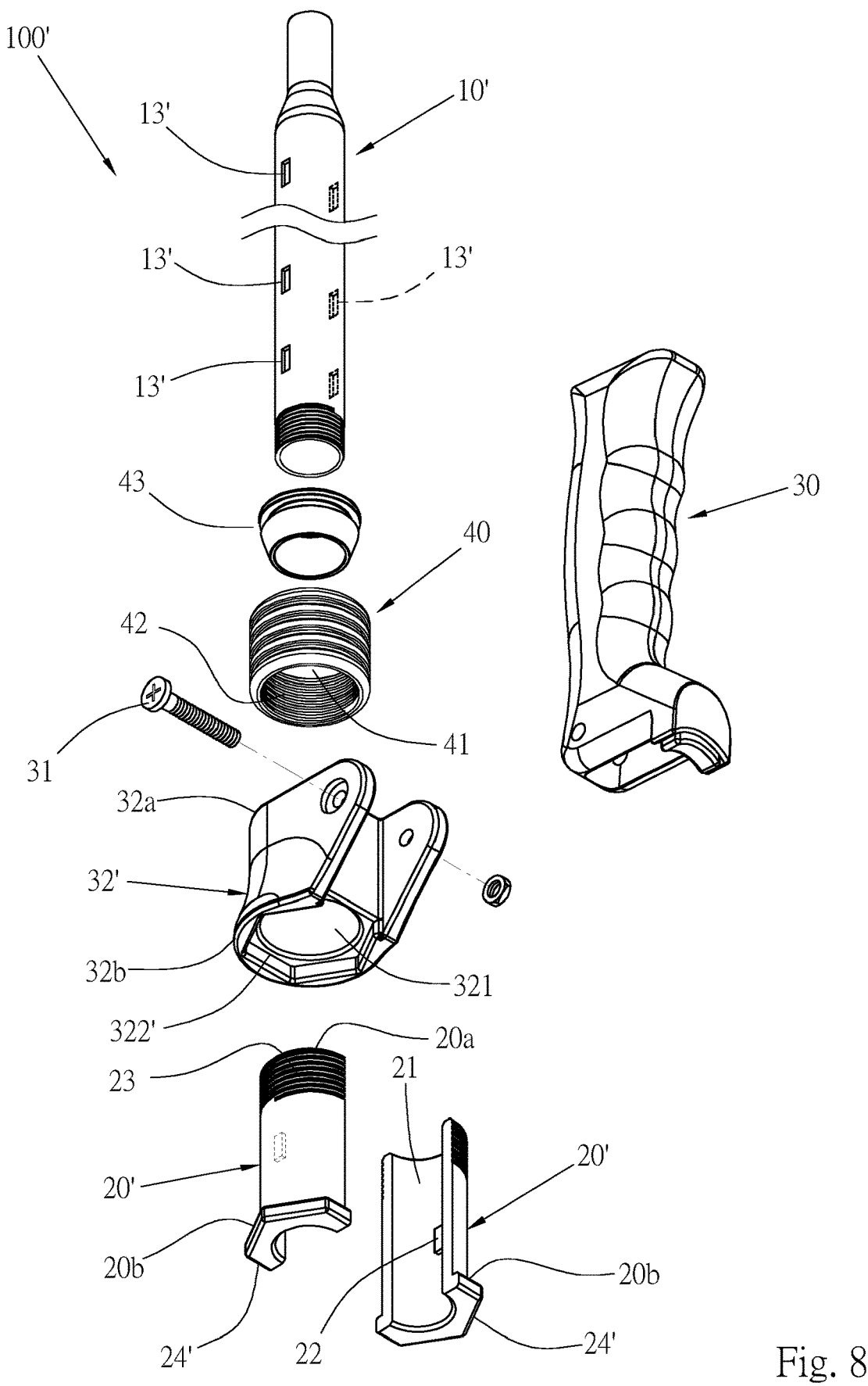
FIG. 8 is an exploded perspective view of the assembly structure in FIG. 7.
Figure 9:
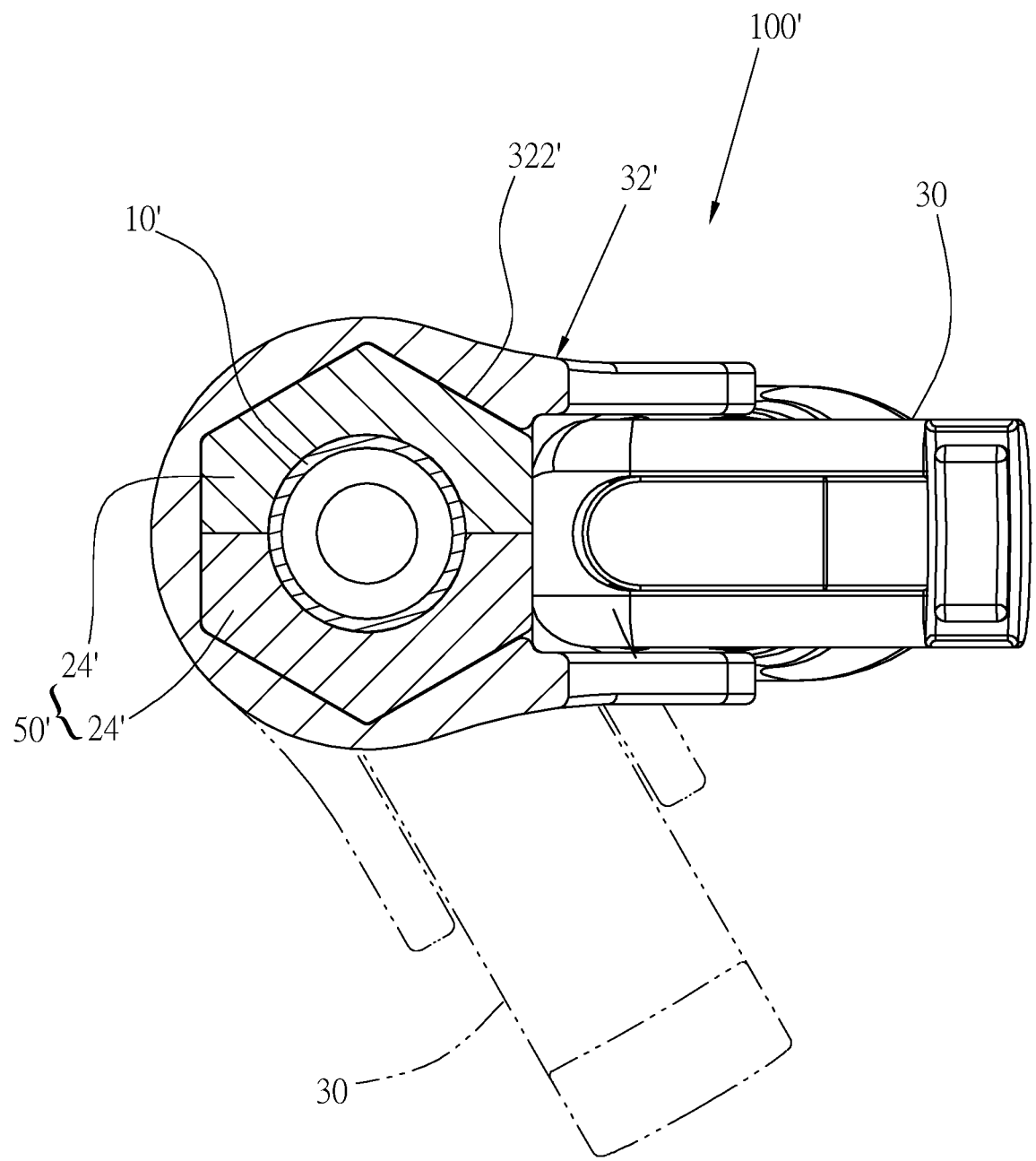
FIG. 9 is a sectional view taken along section line 9-9 in FIG. 7.

FIG. 7 to FIG. 9 show the assembly structure 100' of a tubular body and a handle according to the second preferred embodiment of the present invention. The major components and the assembly method of the second embodiment are generally the same as those of the first embodiment, and the same components in these two embodiments are indicated by the same reference numeral in the drawings. The differences between the second embodiment and the first embodiment are as follows:

The outer peripheral wall of the tubular body 10' is provided with a plurality of insertion holes 13' that are arranged on two sides of the tubular body 10' along the axial direction of the tubular body 10'. The two positioning posts 22 of the two connecting members 20' can be selectively and respectively inserted into any corresponding pair of the insertion holes 13' in order to change and adjust the position at which the handle 30 is mounted on the tubular body 10'.

In addition, the groove 322' of the coupling base 32' is shaped as a regular polygon, such as a quadrilateral, a pentagon, a hexagon, and so on. The groove 322' in this embodiment is a regular hexagon. When the two connecting members 20' are put together, the blocking member 50' formed by the blocking ledges 24' also has a regular polygonal configuration that matches the configuration of the groove 322'. The blocking ledge 24' of each connecting member 20' has a multi-sided outer periphery consisting of two long sides and two short sides, wherein the two long sides are connected to each other and are flanked by the two short sides respectively, in order for the two blocking ledges 24' to jointly form the regular hexagonal blocking member 50'. Once the coupling base 32' is mounted around the two connecting member 20', the hexagonal blocking member 50' is fitted in the hexagonal groove 322' as shown in FIG. 9. The polygonal blocking member 50' and the polygonal groove 322' work together to position the blocking member and the handle 30 at a specific angular position. The handle 30 and the coupling base 32', therefore, can be mounted selectively at different angular positions on the tubular body 10', such as the solid-line position and the imaginary dotted-line position in FIG. 9. Since the blocking member 50' and the groove 322' are hexagonal, there are six angular positions to choose from. As long as the blocking member 50' is fitted in the groove 322', the coupling base 32' is kept from rotating with respect to the connecting members 20'.

Figure 10:
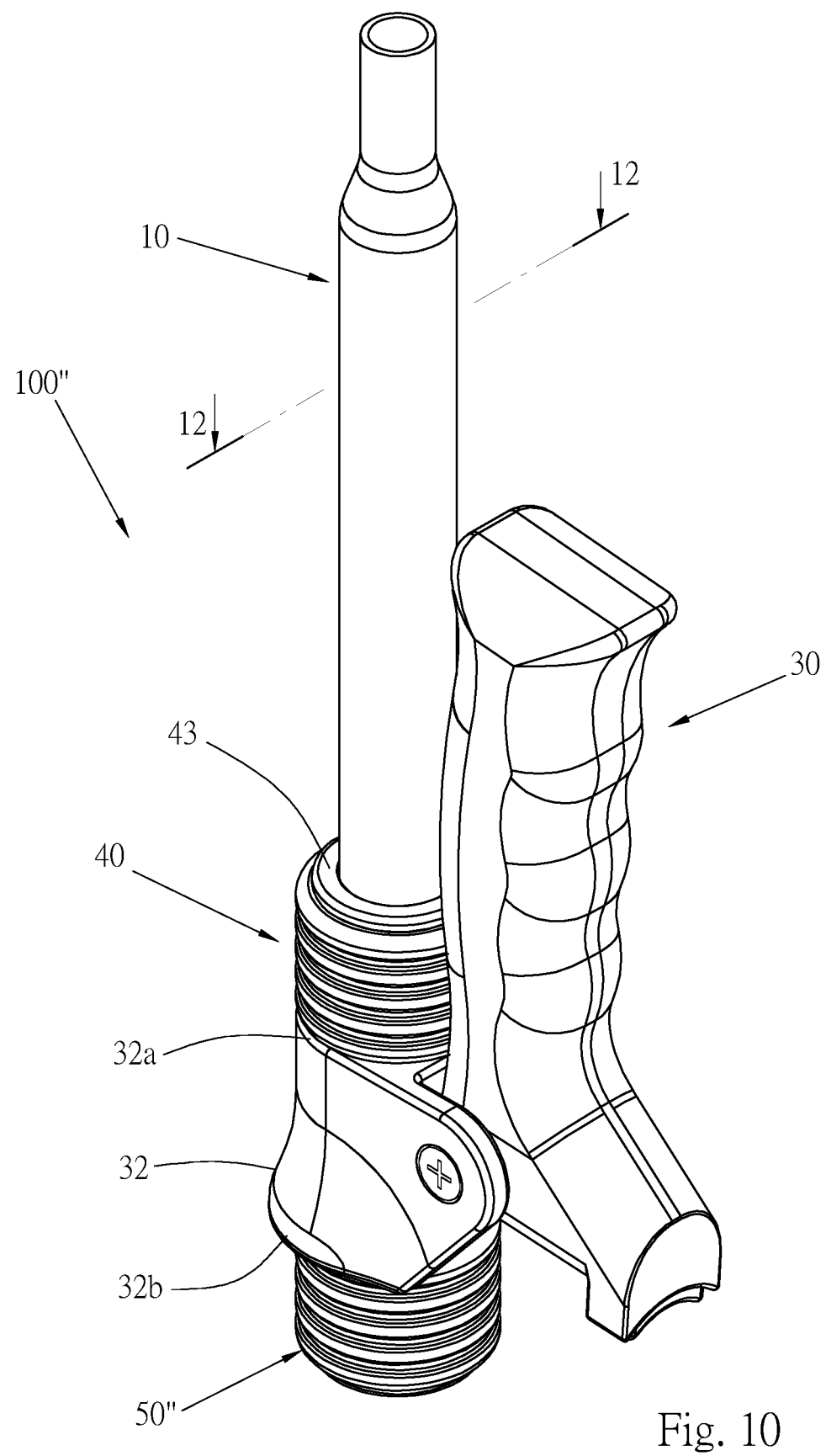
FIG. 10 is a perspective view of the assembly structure of a tubular body and a handle according to the third preferred embodiment of the invention.
Figure 11:
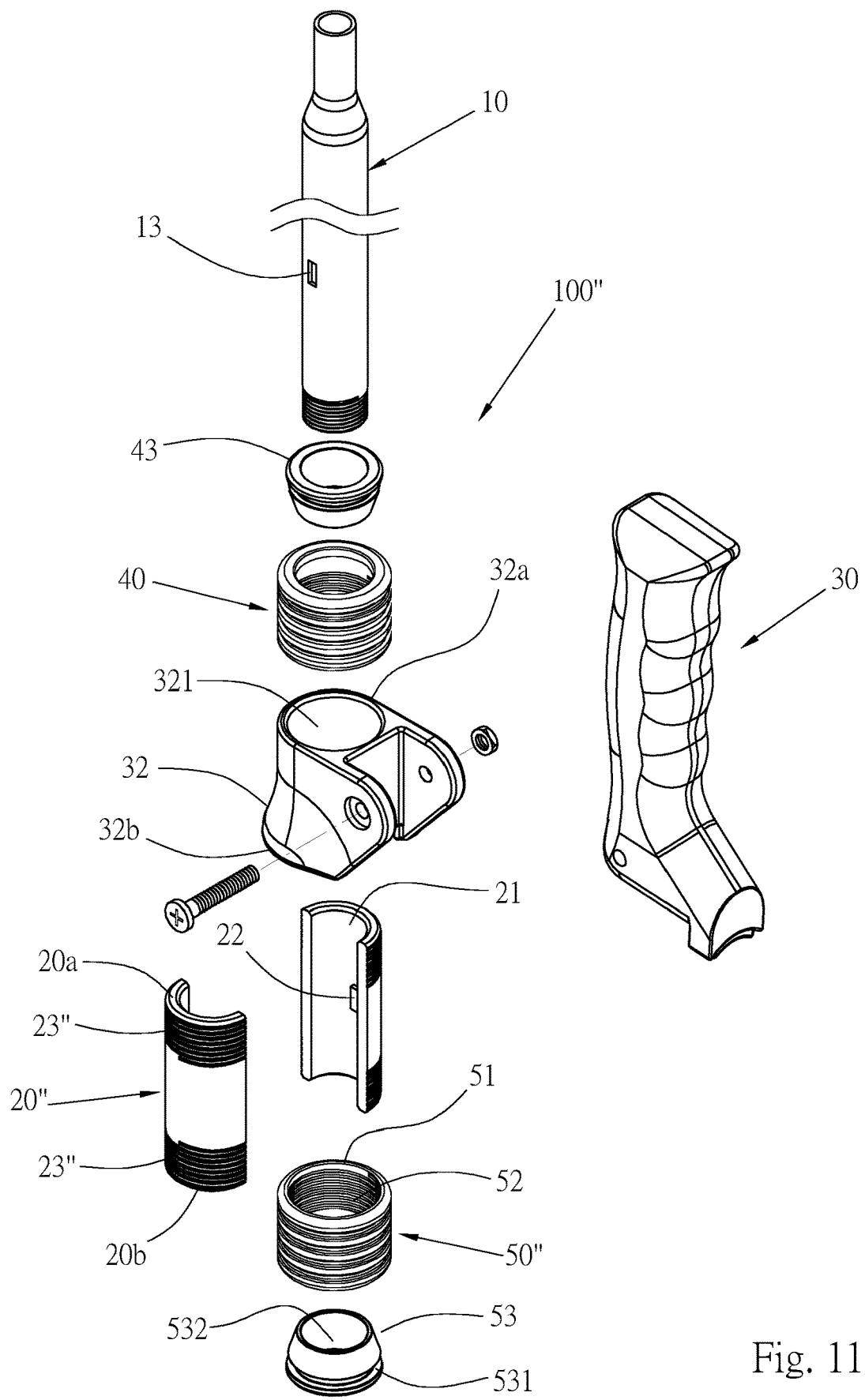
FIG. 11 is an exploded perspective view of the assembly structure in FIG. 10.
Figure 12:
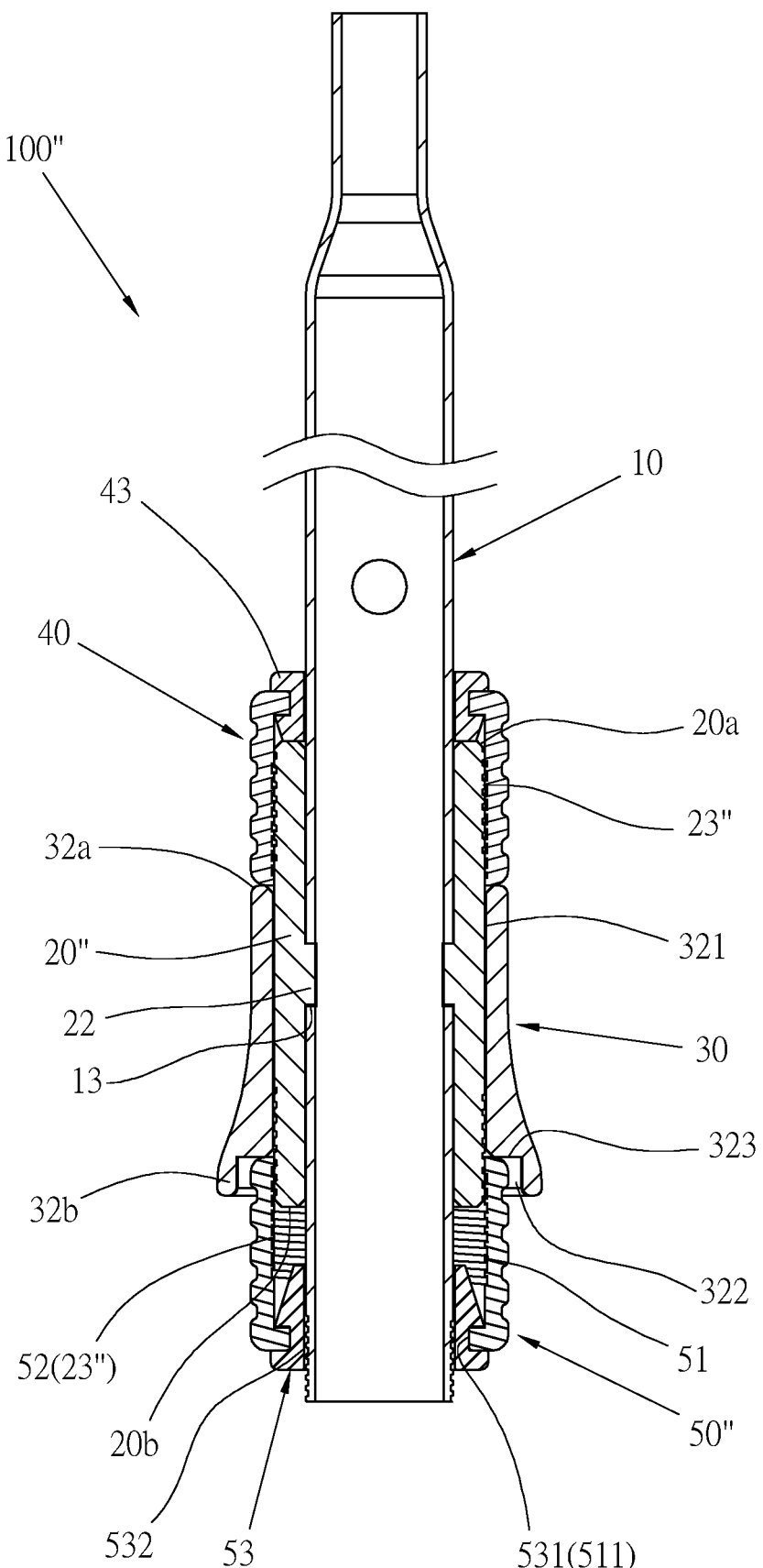
FIG. 12 is a sectional view taken along section line 12-12 in FIG. 10.

FIG. 10 to FIG. 12 show the assembly structure 100" of a tubular body and a handle according to the third preferred embodiment of the present invention. The major components and the assembly method of the third embodiment are generally the same as those of the first embodiment and therefore will not be described repeatedly. The same components in these two embodiments are indicated by the same reference numeral in the drawings. The differences between the third embodiment and the first embodiment are as follows:

The outer periphery of the first end 20a of each connecting member 20" is provided with an external thread 23", and so is the outer periphery of the second end 20b of each connecting member 20". Both the first ends 20a and the second ends 20b of the two connecting members 20" are exposed from the mounting hole 321 and exposed out of the coupling base 32.

Moreover, the blocking member 50" is a mounting tube and defines therein a through hole 51 that extends along the axial direction of the blocking member 50". The wall of the through hole 51 is provided with an internal thread 52, the blocking member in this embodiment is also a nut. The blocking member 50" is mounted around the second ends 20b of the two connecting members 20" (i.e., the second ends 20b are inserted into the through hole 51 of the blocking member 50"), with the internal thread 52 threadedly connected with the external threads 23" at the second ends 20b of the two connecting members 20", and has one end abutting against the second end 32b of the coupling base 32. Thus, the coupling base 32 is blocked by the position-limiting member 40 and the blocking member 50" at two ends respectively and is hence retained in place. The other end (hereinafter referred to as the second end) of the blocking member 50" is connected with another flexible sealing member 53. The second end of the locking member 50" forms a flange 511 that extends inward from the periphery of the through hole 51. The outer periphery of the flexible sealing member 53 is circumferentially provided with an annular groove 531. The flange 511 of the blocking member 50" is fitted in the annular groove 531 of the sealing member 53. The sealing member 53 has a through bore 532 at the center to allow passage of the tubular body 10. The flexible sealing member 53 serves to seal the gap between the blocking member 50" and the tubular body 10.

The assembly structure disclosed herein of a tubular body and a handle allows the handle to be connected to the tubular body and secured in position simply by mounting the two connecting members, the coupling base, the position-limiting member, and the blocking member onto the tubular body. The assembly structure can be easily assembled, has its components securely positioned, and no drilling operation is required for any components. In addition, the embodiments described above allow the handle to be adjusted in terms of its position on the tubular body and be fixed at different angular positions.

The foregoing embodiments are provided for illustrative purposes only and are not intended to be restrictive of the scope of the present invention. As the assembly structure of a tubular body and a handle of the invention is the first of its kind and involves an inventive step, a patent application for the invention is hereby filed according to law.

What is claimed is:

1. An assembly structure of a tubular body and a handle, comprising:
   a tubular body, which has an outer peripheral wall with two sides each provided with at least one insertion hole;
   two connecting members each having a wall surface curved inward to form a concave surface, the concave surface of each of the two connecting members is protrudingly provided with a positioning post, the two concave surfaces of the two connecting members are mounted on the outer periphery of the tubular body, the two positioning posts are inserted into the two insertion holes of the tubular body respectively, and each of the two connecting members has two ends defined respective as a first end and a second end;
   a handle, which is connected to a coupling base, the coupling base has a first end and a second end; a mounting hole is provided in and passes through the coupling base and opens at the first end and the second end of the coupling base, the coupling base is mounted around the two connecting members, and the two connecting members are restricted in the mounting hole;
   a position-limiting member formed as a hollow cylinder, the position-limiting member has a through hole extending along an axial direction of the position-limiting member, and the position-limiting member is connected to the first ends of the two connecting members and abuts against the first end of the coupling base; and
   a blocking member provided at the second ends of the two connecting members, the blocking member abuts against the second end of the coupling base.

2. The assembly structure of claim 1, wherein the position-limiting member is detachably mounted at the first ends of the two connecting members.

3. The assembly structure of claim 2, wherein the first ends of the two connecting members are exposed out of the coupling base, the first end of each of the two connecting members is provided with a thread; the position-limiting member is provided with a thread, and the position-limiting member is threadedly connected to the first ends of the two connecting members.

4. The assembly structure of claim 3, wherein the second end of each of the two connecting members is provided with an outwardly extending blocking ledge, and the two blocking ledges of the two connecting members form the blocking member.

5. The assembly structure of claim 4, wherein the second end of the coupling base is concavely provided with a groove, the groove has a width greater than a diameter of the mounting hole such that a blocking shoulder is formed between the groove and the mounting hole, and the blocking member is fitted in the groove and abuts against the blocking shoulder.

6. The assembly structure of claim 5, wherein the groove is circular, and the blocking ledge of each of the two connecting members is semicircular.

7. The assembly structure of claim 5, wherein the groove is polygonal, and outer peripheries of the blocking ledges of the two connecting members form a polygon matching the groove in configuration.

8. The assembly structure of claim 1, wherein the blocking member is detachably connected to the second ends of two connecting members.

9. The assembly structure of claim 8, wherein the second ends of the two connecting members are exposed out of the coupling base, the second end of each of the two connecting members is provided with a thread, the blocking member is a hollow cylinder and has a through hole extending along an axial direction of the blocking member, the blocking member is also provided with a thread, and the blocking member is threadedly connected to the second ends of the two connecting members.

10. The assembly structure of claim 1, wherein a plurality of said insertion holes are provided on each of the two corresponding sides of the outer peripheral wall of the tubular body along a longitudinal direction of the tubular body.

11. The assembly structure of claim 2, wherein the position-limiting member has one end abutting against the coupling base and an opposite end connected with a flexible sealing member, and the flexible sealing member seals a gap between the position-limiting member and the tubular body.

12. The assembly structure of the tubular body and the handle as claimed in claim 8, wherein the blocking member has one end abutting against the coupling base and an opposite end connected with a flexible sealing member, and the flexible sealing member seals a gap between the blocking member and the tubular body.

* * * * *